United States Patent [19]
Weich

[11] Patent Number: 5,417,101
[45] Date of Patent: May 23, 1995

[54] METHOD AND APPARATUS FOR TESTING THE INTEGRITY OF FILTER ELEMENTS

[75] Inventor: Gerhard Weich, Dreieich, Germany

[73] Assignee: Pall Corporation, Glen Cove, N.Y.

[21] Appl. No.: 895,841

[22] Filed: Jun. 9, 1992

[30] Foreign Application Priority Data

Jun. 10, 1991 [DE] Germany .................. 41 19 040.8

[51] Int. Cl.⁶ .............................................. G01M 3/26
[52] U.S. Cl. ............................................. 73/38; 73/40
[58] Field of Search ...................................... 73/38, 40

[56] References Cited

U.S. PATENT DOCUMENTS

| | | | |
|---|---|---|---|
| 4,449,392 | 5/1984 | Huschke | 73/40 |
| 4,511,471 | 4/1985 | Müller | 210/323.2 |
| 4,614,109 | 9/1986 | Hofmann | 73/38 |
| 4,701,861 | 10/1987 | Kauke | 73/40 |
| 4,872,974 | 10/1989 | Hirayama et al. | 73/38 |
| 4,881,176 | 11/1989 | Kononov | 73/38 |
| 4,909,937 | 3/1990 | Hoffmann et al. | 210/315 |
| 5,005,430 | 4/1991 | Kibler et al. | 73/863.33 |
| 5,064,529 | 11/1991 | Hirayama et al. | 73/38 |

FOREIGN PATENT DOCUMENTS

| | | |
|---|---|---|
| 0314822 | 5/1989 | European Pat. Off. . |
| 3805299 | of 1988 | Germany . |
| 3901644 | 7/1989 | Germany . |
| 57-102212 | of 1982 | Japan . |

Primary Examiner—Hezron E. Williams
Assistant Examiner—Daniel S. Larkin
Attorney, Agent, or Firm—Leydig, Voit & Mayer

[57] ABSTRACT

A method and apparatus for testing the integrity of filter elements is provided. The filter assembly comprises a plurality of filter elements which are subdivided into a plurality of sections. By measuring the gas flow rate under known pressure conditions through all of the sections or a selected portion of the sections, defective filter elements can be isolated in a systematic manner.

14 Claims, 2 Drawing Sheets

METHOD AND APPARATUS FOR TESTING THE INTEGRITY OF FILTER ELEMENTS

The present invention relates to a method and apparatus for testing the integrity of filter elements in a filter assembly comprising a plurality of filter elements. The invention is particularly applicable to filter systems comprising a very large number of filter elements where the determination of a defective element among so many elements becomes difficult.

Large dimensioned filter systems of various construction are known in which 100 or more filter elements are arranged in one large filter housing. In many applications, for example, in the food and beverage industry or in the pharmaceutical industry, large scale filtration also has to be carried out under sterile conditions. Not only the filter housing but the filter elements along with the filter material must be regularly sterilized. Such sterilization performed for example with hot water or steam can deteriorate the integrity of the filter material, especially when the sterilization has to be carried out frequently.

Deterioration of the filter material and/or other pans of the filter element can also arise in other applications, for example, when chemically aggressive substances or high temperature gases are to be filtered. The deterioration of the filter element can occur in the form of the filter material itself being degraded or a joining of the filter material to the filter housing may become defective and act as a by-pass, i.e. have an opening greater than pore size.

In large filter systems the degradation of one or more individual filter elements can lead to a substantial bacteria contamination of the filtered fluid and possibly the shut-down of the filtration operation. Finding the particular element or elements responsible among the 100 or more elements can be a very time-consuming task, particularly if this is done on a trial and error basis. Means of locating the defective elements in a systematic way are needed.

An object of the present invention is therefore to provide a method of testing the integrity of a large number of filter elements and a filter assembly for carrying out the method by which damaged filter elements can be isolated in a rapid, systematic and efficient manner.

In accordance with the present invention a method of testing the integrity of filter elements is provided as defined in the claims. A plurality of filter elements to be tested, preferably following a sterilization procedure, are wetted (preferably with water). The filter elements with wetted filter material are then subjected to a gas pressure, preferably air pressure, and the resulting gas flow rate collectively through all of the filter elements is measured. By comparing the measured flow rate with a first desired flow rate, the integrity of the filter elements of the entire assembly can be determined. This is accomplished by calculating the amount of deviation between the measured air flow rate and the first desired flow rate. If the deviation falls within a first preset range, this is an indication that all of the elements are intact.

In a preferred embodiment, when the measured gas flow rate exceeds the first desired flow rate by an amount outside of the preset range, this is an indication that at least one of the filter elements is defective. In this embodiment, gas passage through a first section containing only a portion of the plurality of filter elements is then closed off. The flow rate through the remaining filter elements is measured and compared with a second desired flow rate corresponding to the resulting reduced number of filter elements. When this comparison shows that the measured flow rate is within a second preset range, this indicates that the reduced number of filter elements are intact, while the sought after defective element or elements are located in the first section of elements which were closed off in the test.

If however, the defective element or elements are not found in this first section of closed off elements, the above procedure is repeated by successively closing the gas passage in further sections until that section is found which has the defective element or elements. The test procedure has the advantage that individual sections of a large number of filter elements can be checked in a systematic manner. Once as the defective section is isolated, the individual elements of this section being of a smaller number can be tested rapidly.

According to the present invention a filter assembly is also provided for carrying out the above method as defined in the claims. The filter assembly comprises a plurality of filter elements, where the elements are subdivided into a plurality of sections, each containing a portion of the filter elements. Each section is provided with an outlet header connected to the individual outlet openings of each of the filter elements in its section. The assembly further comprises valve means arranged in an outlet conduit connected to each of the outlet headers. With these valve means gas flow can be closed off to any particular section during the test procedure. This arrangement allows the isolation of individual groups of elements, which is an enormous timesaving advantage in locating individual damaged elements.

In a further embodiment, the plurality of filter elements are arranged in a common vessel containing the fluid to be filtered, where each filter element has a filter material surface which is in direct contact with the influent fluid. In this arrangement of the filters, the gas pressure applied during the integrity test to the filter inlet surface is the same for all filter elements.

In a further embodiment it has been found that the sections of filter elements should preferably comprise 2 to 15 filter elements, more preferably 3 to 7 filter elements.

Further objects and advantages of the present invention will become apparent through the following description of preferred embodiments in conjunction with the drawing.

Figure 1:
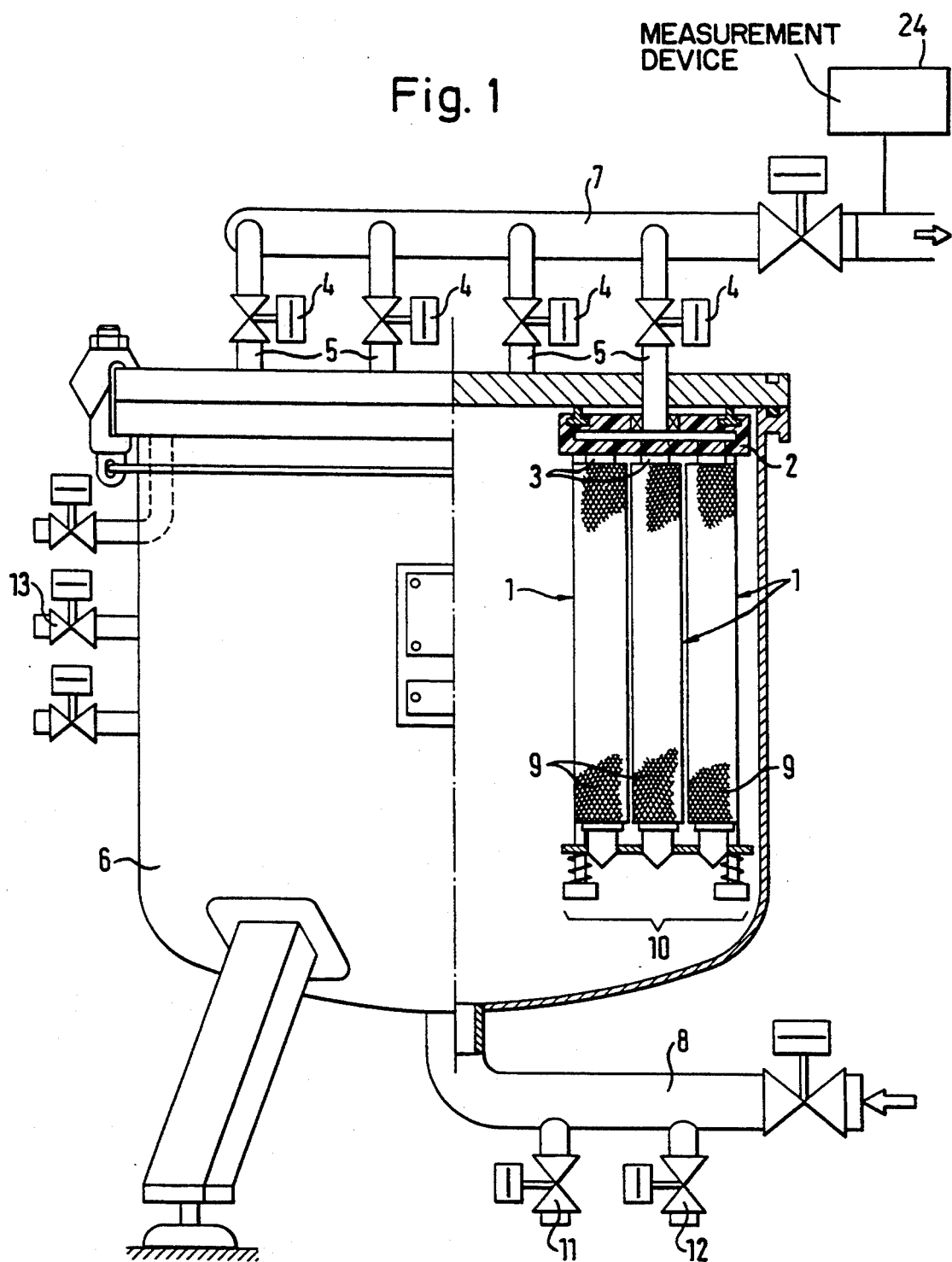
FIG. 1 shows a preferred embodiment of the filter assembly according to the present invention.

Turning to FIG. 1, a filter assembly in accordance with one embodiment of the present invention is shown. A plurality of filter elements 1 are arranged in a as housing shown in the form of a large vessel 6. An inlet conduit 8 communicates with the inner volume of the vessel 6. After passing the filter elements 1, the filtrate leaves the vessel 6 through the conduits 5. Outlet conduit 7 collects the outgoing filtrate. The basic elements of the filter assembly described above are shown in FIG. 2, another embodiment where the inlet and outlet of the fluid to be filtered is located below the vessel 6 containing the filter elements 1.

Figure 2A:
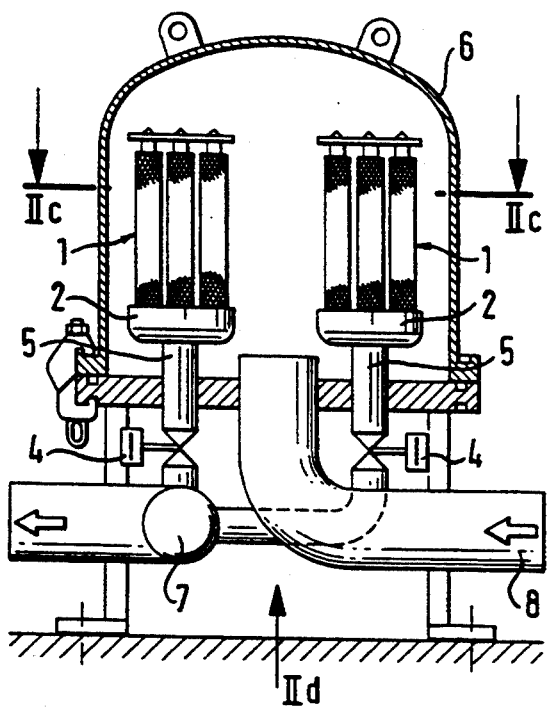
FIGS. 2a to 2d show a further embodiment of the filter assembly according to the present invention.
Figure 2B:
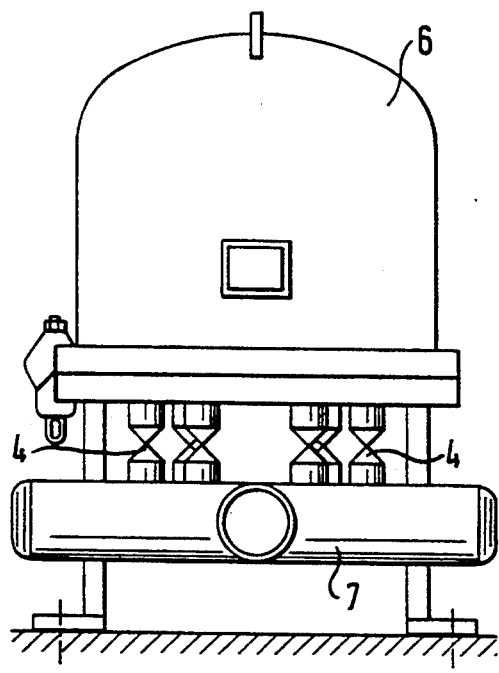
Figure 2C:
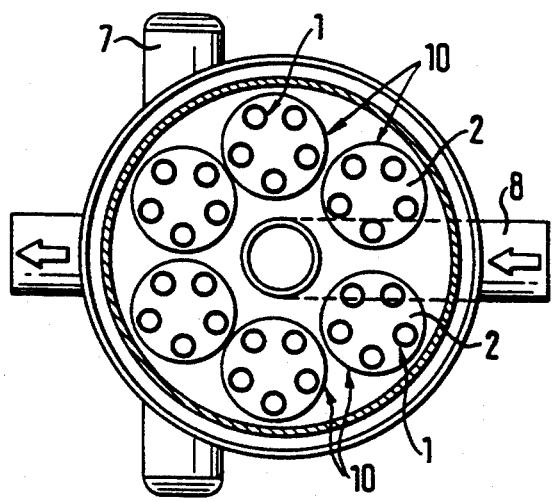
Figure 2D:
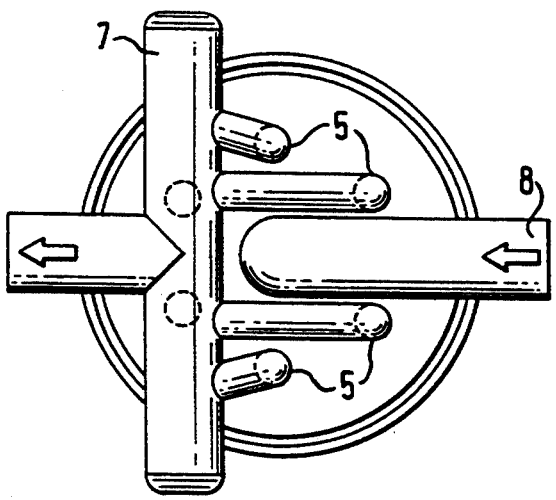

The filter assembly in accordance with the invention further comprises an outlet header 2 which is connected to the individual outlet openings 3 of the filter elements 1. The filter elements are divided into a number of sections 10 each having one outlet header 2. Only one section is illustrated in FIG. 1. In the embodiment of FIG. 2, six sections of filter elements are illustrated, as best seen in FIG. 2c. The filter assembly further comprises valve means 4 located in the outlet conduits 5, which are connected to each of the outlet headers 2.

The valve means can be any suitable type of valve, preferably valves which can be employed in a computer-controller automated system. Such valves include ball valves, clack valves or membrane valves. The headers or adapters 2 are designed as to connect to the outlet openings 3 of a predetermined number of filter elements 1. In this arrangement, gas flow through all of the elements 1 in the section 10 can be controlled by the single valve 4 in the outlet conduit 5. Several sections 10 of the filter elements can also be closed off simultaneously. The filter elements in such filter systems are generally of cylindrical form, whereby the outer portion of the cylinder is made up of the filter material. As shown in FIG. 1, the outer surface 9 of the filter material is in direct contact with the interior of the vessel 6. The filter elements can be mounted onto the outlet header 2 in any convenient manner. The outlet header is preferably formed of a synthetic material, PVDF is particularly preferred.

The filter assembly of the present invention is suited for applications in industry where the filter elements may be damaged through purification, decontamination or sterilization procedures which are necessary for reasons of product quality. For example in the beverage industry absolutely sterile conditions are required. After a production time, i.e. filtration operation time, of one or more days, such systems must be evacuated and subjected to a sterilization treatment. The filter elements may be damaged due to the high temperatures and pressures used in sterilization, which is normally carried out with steam and/or hot water. If the filter elements do not withstand such treatment or their material structure is altered, the specified as and validated removal efficiency is no longer available when the normal production operation of the system is restarted.

According to the present invention, the integrity of the filter elements can be tested at this point, i.e. before restart of the filter operation. According to the present method, the integrity of the filter elements is tested making use of a filter assembly subdivided into a plurality of sections as described above. The test is based on the gas diffusion and bulk flow through liquid wetted filter elements. One important application of this method is sterile filter operations where microorganisms should be retained by the filter material. In this case, the pore size of the filter material must remain correspondingly small, in other words the sterilization treatment should not enlarge the pore sizes to the extent that microorganisms could pass through the filter material.

The integrity of the elements is determined by first wetting the filter material, preferably with water for hydrophilic membranes. If the filter material is hydrophobic, the wetting agent is preferably a solvent or alcohol or a liquid mixture of low surface tension. Wetting can be performed by filling the vessel 6 with the wetting agent through an inlet connection 11, followed by draining the vessel through an outlet connection 12. The wetting agent is selected depending on the filtration problem and the corresponding selected filter material.

After wetting, the filter elements are subjected to a fluid pressure. The test fluid can be supplied through the conduit 13 of FIG. 1. Depending on the application, the fluid can be a gas or a liquid, although a gas is particularly preferred. Suitable gases include air or nitrogen.

In the present embodiment, air is the preferred gas medium. The gas is supplied to the interior of the vessel at a pressure in the range of 50 to 6000 mbar. When supplying the gas, the valves 4 in the outlet conduits 5 are held open. The pressure of the supplied gas is preferably maintained at a constant value during the testing procedure.

The resulting gas flow rate through the wetted filter material of all of the plurality of filter elements 1 is then measured by a measuring device 24 depicted in FIG. 1. This measured flow rate is compared with a desired flow rate which corresponds to the situation in which the filters are in their intact condition. This desired flow rate as can also be set to account for possible clogging of the filter element through previous use. Other operational parameters, for example the type of filter or how long it has been in operation will also determine this value. If the deviation between the measured flow rate and the first desired flow rate lies within a first preset range, this indicates that all of the filter elements are intact and the integrity test is completed with a positive result.

On the other hand, when the measured gas flow rate exceeds the first desired flow rate by an mount greater than allowed by the first preset control range, the method of testing is continued further to locate the defective elements. In this embodiment, the gas passage is dosed by means of the valves 4 through at least one section of the filter elements containing a portion of the plurality of filter elements. As indicated above, either one of the sections 10 or several such sections can be dosed off simultaneously by actuation of the individual valves 4, as is best seen in FIG. 2.

Having dosed off at least one section, the gas flow rate through the wetted filter material of the remaining filter elements is now measured. This new flow rate is then compared to a second desired flow rate corresponding to the resulting reduced number of filter elements available for gas passage. From this comparison, the deviation is determined and compared with a second preset range, which may also be different from the first preset range depending on the number of filter elements available. When this deviation is within the second preset range, this indicates that the filter elements passed are intact, while the one or more sections of filter elements which have been closed off must contain the defective elements. If the newly measured flow rate, on the other hand, exceeds the second desired flow rate by an amount outside of the allowed range, the steps above are repeated where the gas passage is dosed off for successive individual sections or possibly further groups of sections until a single section of filter elements is located having the defective element or elements.

The particular choice of which section or group of sections is closed off first, or what sections at what locations in the vessel are closed off in what sequence will depend on the particular application. This may also depend on the operator of the filtration system who has knowledge of which groups or sections of elements have been operating in the system longer and are more likely to lose their filtration capacity.

After the single section having defective elements is isolated, the individual elements can be examined individually. It has been found through experimentation that a reliable test of integrity can be performed when up to 40 filter elements are contained in each section. It is presently preferred that each section comprise 2 to 15 filter elements, more preferably 3 to 7 filter elements.

The present method is particularly suitable for sterile filtration systems where the filter material of the filter elements is of the membrane type. Such filter membrane material will present a barrier to bacteria or to microorganisms possibly contained in the fluid to be filtered. The present method and filter assembly therefore is particularly suited but not limited to application in the beverage and pharmaceutical industries.

It is also contemplated that the entire method be fully automated. The necessary servo-mechanisms for controlling the valves for gas inlet and outlet belong to the filtration system. Means for the measurement of flow rates are well-known in the art. Computational means for performing the comparisons of measured and desired flow rates are also well-known in systems control.

I claim:

1. A method of testing the integrity of filter elements in a filter assembly comprising a plurality of filter elements which are subdivided into a plurality of sections, said method comprising the steps:
    a) wetting a filter material of said plurality of filter elements;
    b) subjecting the filter elements with wetted filter material to a gas pressure;
    c) measuring a bulk gas flow rate through the wetted filter material of all of said plurality of filter elements;
    d) determining whether the measured bulk gas flow rate deviates from a first desired flow rate by an amount within a first preset range, wherein a deviation within said preset range indicates that all filter elements are intact;
    e) closing gas passage through at least one section of filter elements containing a portion of said plurality of filter elements;
    f) measuring a bulk gas flow rate through the wetted filter material of filter elements disposed in remaining sections open to gas passage;
    g) determining whether the measured bulk gas flow rate of step f) deviates from a second desired flow rate corresponding to the number of filter elements disposed in remaining sections open to gas passage by an amount within a second preset range, wherein a deviation of the measured bulk gas flow rate of step f) from a second desired flow rate within the second preset range indicates that one or more of the filter elements in said at least one section of step e) is not intact.

2. Method of claim 1, wherein when the measured bulk gas flow rate of step f) exceeds said second desired flow rate by an amount greater than allowed by said second preset range, the steps e), f) and g) are repeated while closing the gas passage in step e) for other sections of said plurality of filter elements until a deviation is found in step g) indicating a single section of filter elements in which at least one filter element is not intact.

3. Method of claim 1 wherein said gas pressure is in the range of 50 to 6000 mbar.

4. Method of claim 1 wherein said gas pressure is held at a constant value.

5. Method of claim 1 wherein said gas is air.

6. Method of claim 1 wherein said filter elements have been subjected to a sterilization at preselected temperatures prior to said integrity testing.

7. A filter assembly for carrying out the method of claim 1 comprising:
    a plurality of filter elements divided into a plurality of sections, each section containing a portion of said plurality of filter elements;
    a plurality of outlet headers, each one of said plurality of headers being connected to a respective one of the plurality of sections, said headers communicating with individual outlet openings of the filter elements;
    a plurality of valves, each one of said plurality of valves coupled to a corresponding outlet conduit.

8. The filter assembly of claim 7, wherein said plurality of filter elements are arranged in a vessel.

9. Filter assembly of claim 7 wherein each of said sections of filter elements connected to each of said outlet headers comprises in the range of 2 to 15 filter elements.

10. A filter assembly according to claim 7 wherein each of said sections of filter elements connected to each of said outlet headers comprises in the range of 3 to 7 filter elements.

11. A method of testing the integrity of filter elements in a filter assembly comprising a plurality of filter elements which are subdivided into a plurality of sections, said method comprising:
    a) subjecting the filter elements to a gas pressure;
    b) measuring a parameter indicative of integrity of the plurality of filter elements;
    c) determining whether the measured parameter deviates from a first desired parameter by an amount within a first preset range, wherein a deviation within the preset range indicates that the filter elements are intact;
    d) closing gas passage through at least one section of filter elements;
    e) measuring a parameter indicative of integrity of the filter elements disposed in remaining sections open to gas passage; and
    f) determining whether the measured parameter of step e) deviates from a second desired parameter corresponding to the number of filter elements disposed in remaining sections open to gas passage by an amount within a second preset range, wherein a deviation of the measured parameter of step e) from a second desired parameter within the second preset range indicates that one or more of the filter elements in said at least one section of step d) is not intact.

12. A method of testing the integrity of filter elements as claimed in claim 11 wherein the parameter indicative of integrity of the plurality of filter elements includes a bulk gas flow rate through the filter elements.

13. A method of testing the integrity of filter elements as claimed in claim 11 further comprising:
    g) continuing to close gas passage through said at least one section and closing gas passage through another section when the measured parameter of step e) deviates from the a second desired parameter by an amount outside of the second preset range.

14. A method of testing the integrity of filter elements as claimed in claim 13 further comprising repeating steps e), f) and g) until the measured parameter of step e) deviates from the second desired parameter by an amount within the second preset range.

* * * * *